(12) United States Patent
Ito et al.

(10) Patent No.: US 12,404,405 B2
(45) Date of Patent: Sep. 2, 2025

(54) THERMALLY CONDUCTIVE COMPOSITE AND A METHOD FOR PREPARING THE SAME

(71) Applicant: Shin-Etsu Chemical Co., Ltd., Tokyo (JP)

(72) Inventors: Takanori Ito, Annaka (JP); Akihiro Endo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 613 days.

(21) Appl. No.: 17/604,871

(22) PCT Filed: Apr. 20, 2020

(86) PCT No.: PCT/JP2020/017042
§ 371 (c)(1),
(2) Date: Oct. 19, 2021

(87) PCT Pub. No.: WO2020/218235
PCT Pub. Date: Oct. 29, 2020

(65) Prior Publication Data
US 2022/0220311 A1    Jul. 14, 2022

(30) Foreign Application Priority Data

Apr. 24, 2019    (JP) .................................. 2019-082836

(51) Int. Cl.
| | | |
|---|---|---|
| C08L 83/04 | (2006.01) | |
| C08K 3/08 | (2006.01) | |
| C08K 3/22 | (2006.01) | |
| C08K 3/28 | (2006.01) | |
| C08K 5/14 | (2006.01) | |
| C08K 5/541 | (2006.01) | |
| C09J 7/38 | (2018.01) | |
| C09J 183/00 | (2006.01) | |

(52) U.S. Cl.
CPC ............... *C08L 83/04* (2013.01); *C08K 3/08* (2013.01); *C08K 3/22* (2013.01); *C08K 3/28* (2013.01); *C08K 5/14* (2013.01); *C08K 5/541* (2013.01); *C09J 7/38* (2018.01); *C09J 183/00* (2013.01); *C09J 2301/408* (2020.08); *C09J 2479/086* (2013.01); *C09J 2483/00* (2013.01)

(58) Field of Classification Search
CPC .. C08L 83/04; C08K 3/08; C08K 3/22; C08K 3/28; C08K 5/14; C08K 5/541; C08K 2201/001; C09J 7/38; C09J 183/00; C09J 2301/408; C09J 2479/086; C09J 2483/00; C09J 183/04; C09J 2203/326; C09J 2400/143; C09J 7/30; C09J 2301/124; C09J 2400/263; C09J 2427/006; C09J 2467/006; C08G 77/12; C08G 77/16; C08G 77/20

See application file for complete search history.

(56) References Cited

U.S. PATENT DOCUMENTS

| | | | | |
|---|---|---|---|---|
| 8,268,902 B2 | * | 9/2012 | Casalini | ................. C08J 9/0066 |
| | | | | 524/1 |
| 2004/0213994 A1 | * | 10/2004 | Kozakai | .............. H01L 21/6836 |
| | | | | 428/354 |
| 2008/0254247 A1 | | 10/2008 | Asaine | |
| 2015/0299531 A1 | | 10/2015 | Tojo et al. | |
| 2016/0086713 A1 | | 3/2016 | Iwata et al. | |
| 2018/0085977 A1 | * | 3/2018 | Ezaki | ....................... C08J 5/043 |
| 2019/0316018 A1 | | 10/2019 | Ito et al. | |

FOREIGN PATENT DOCUMENTS

| | | | | |
|---|---|---|---|---|
| JP | 2002121529 A | | 4/2002 | |
| JP | 2004273669 A | * | 9/2004 | ........... B32B 25/042 |
| JP | 5283346 B2 | | 9/2013 | |
| JP | 2014034652 A | | 2/2014 | |
| JP | 2014062220 A | | 4/2014 | |
| JP | 6020187 B2 | * | 11/2016 | |
| JP | 2016204600 A | * | 12/2016 | |
| JP | 2018193491 A | | 12/2018 | |
| WO | 2014185296 A1 | | 11/2014 | |
| WO | 2014196347 A1 | | 12/2014 | |
| WO | 2018070351 A1 | | 4/2018 | |

OTHER PUBLICATIONS

Ishihara, JP-6020187-MT (Year: 2016).*
Sakurai, JP-2004273669-MT (Year: 2004).*
Ishihara, JP-2016204600-MT (Year: 2016).*
Ishihara-1, JP6020187-MT (Year: 2016).*
English translation of International Search Report corresponding to International Patent Application No. PCT/JP2020/017042 (2 pages) (mailed Jul. 7, 2020).
Li et al. "Study on silicone pressure-sensitive adhesive crosslinked by hydrosilylation and free radical methods" China Adhesives, 26(6):335-338 (2017) (English translation of abstract).

* cited by examiner

*Primary Examiner* — Robert S Jones, Jr.
*Assistant Examiner* — Zhen Liu
(74) *Attorney, Agent, or Firm* — Myers Bigel, P.A.

(57) ABSTRACT

The purpose of the present invention is therefore to provide a thermally conductive composite tape which is in a form of sheet and, therefore, easy to handle, excellent in strength and electrical insulation, easily stick to an element or heat release-member, and shows strong adhesion to the heat-release member. The present invention provides a thermally conductive composite comprising a first thermally conductive adhesive layer, a reinforcing layer (A) layered on one surface of the first thermally conductive adhesive layer, and a second thermally conductive adhesive layer layered on a free surface of the reinforcing layer (A), wherein the first and second thermally conductive adhesive layers comprise, independently of each other, a silicone composition comprising the following components (a) to (e): 100 parts by mass of (a) linear or branched organopolysiloxane, 1,000 to 3,000 parts by mass of (b) thermally conductive filler, 100 to 500 parts by mass of (c) silicone resin, 1 to 10 parts by mass of (d) organohydrogenpolysiloxane, and 0.5 to 5 parts by mass of (e) organic peroxide.

20 Claims, No Drawings

THERMALLY CONDUCTIVE COMPOSITE AND A METHOD FOR PREPARING THE SAME

TECHNICAL FIELD

The present invention relates to a thermally conductive composite to be placed between a thermal boundary surface of a heat-generating element and a heat-release member such as a heat sink or a circuit board, specifically, in order to cool the heat-generating element, and a method for preparing the thermally conductive composite.

BACKGROUND OF THE INVENTION

Semiconductors such as transistors or diodes used in electronic apparatuses such as converters, and power supplies, and LED elements serving as a light source for illumination or displays have becoming of higher performance, higher speed, smaller size, and higher integration, so that they generate a large amount of heat by themselves. The heat elevates a temperature of the apparatuses, which causes malfunction or destruction of the apparatuses. Therefore, many methods for heat release and heat-release members have been proposed to suppress the temperature elevation of semiconductors during operation.

In conventional electronic apparatuses, in order to suppress the temperature elevation of semiconductors during operation, a heat generated from a semiconductor is transferred, via a thermally conductive material, to a cooling member such as heat sink or casing made of a metal plate having a high thermal conductivity such as aluminum or copper and released outside on account of a temperature difference with the atmosphere. A thermally conductive sheet which has an electrical insulation property is often used as the thermally conductive material. The cooling member and the semiconductor are fixed to each other with a screw or clip. The thermally conductive sheet placed is also fixed between the cooling member and the semiconductor by a pressing force applied by the screw or clip. However, the fixing with the screw or clip requires steps of providing the screw or clip, making a through hole for the screw in a casing, a semiconductor element or a substrate and then fixing the sheet. Thus, this fixing method requires many components and steps. Therefore, such a fixing method is very disadvantageous in view of a preparation efficiency. In addition, the components such as screws or clips disturb downsizing or thinning of an electronic apparatus, which is very disadvantageous in product designing.

Then, a method has been proposed where adhesiveness is given to a thermally conductive sheet to be placed between a cooling member and the semiconductor element is fixed to a casing. For instance, an adhesive is applied on both surfaces of a thermally conductive sheet to obtain a thermally conductive sheet comprising an adhesive. However, the adhesive itself has no thermal conductivity, so that the heat conductivity of the thermally conductive sheet with the adhesive is significantly lower. Then, Patent Literatures 1, 2, and 3 describe a thermally conductive adhesive tape having an adhesive material which comprises a thermally conductive filler. Patent Literature 4 describes a thermally conductive silicone adhesive tape which comprises a silicone polymer which has good heat resistance, cold resistance and durability.

PRIOR LITERATURES

Patent Literatures

Patent Literature 1: Japanese Patent Application Laid-Open No. 2014-34652
Patent Literature 2: Japanese Patent Application Laid-Open No. 2014-62220
Patent Literature 3: Japanese Patent Application Laid-Open No. 2002-121529
Patent Literature 4: Japanese Patent No. 5283346

SUMMARY OF THE INVENTION

Problems to be Solved by the Invention

However, conventional adhesive tapes have poor adhesion strength, compared to general-purpose adhesive materials and, therefore, are insufficient to take the place of fixing with screws. In particular, when the adhesive tape is composed of only one layer, improvement in workability, electrical insulation and strength is desired. Some thermosetting adhesives in a non-sheet form requires troublesome application steps and are, therefore, inferior in workability. Further, they have a risk to hold voids, which may worsen electrical insulation.

The purpose of the present invention is therefore to provide a thermally conductive composite tape which is in a form of sheet and, therefore, easy to handle, excellent in strength and electrical insulation, easily stick to an element or heat release-member, and shows strong adhesion to the heat-release member.

Means for Solving the Problems

The present inventors conducted keen researches to solve the aforesaid problems and have found a thermally conductive composite tape wherein both surfaces of a reinforcing layer are laminated with thermally conductive adhesive layers which comprise a silicone resin and a thermally conductive filler and wherein the structure of the silicone resin and the amount of the thermally conductive filler contained in the thermally conductive adhesive layer are specified, whereby a thermally conductive composite tape obtained has a good strength, electrical insulation property and handling ease and has good adhesion strength with a heat-generating element.

If the adhesive composition is of an addition curable type, curing may proceed with time even at room temperature during layering the adhesive layer on the reinforcing layer. Thus, preparation conditions of the composite tape are unstable. Further, even after the preparation of the composite tape, the hardness of the adhesive layer may increase at room temperature, so that the storage stability may be poor. Therefore, the silicone composition in the present invention is peroxide curable whereby the aforesaid problems are solved.

That is, the present invention provides a thermally conductive composite comprising a first thermally conductive adhesive layer, a reinforcing layer (A) layered on one surface of the first thermally conductive adhesive layer, and a second thermally conductive adhesive layer layered on a free surface of the reinforcing layer (A), wherein the first and second thermally conductive adhesive layers comprise, independently of each other, a silicone composition comprising the following components (a) to (e):

100 parts by mass of (a) linear or branched organopolysiloxane, 1,000 to 3,000 parts by mass of (b) thermally conductive filler, 100 to 500 parts by mass of (c) silicone resin, 1 to 10 parts by mass of (d) organohydrogenpolysiloxane, and 0.5 to 5 parts by mass of (e) organic peroxide.

The thermally conductive composite may further comprise (f) at least one selected from the following components (f-1) and (f-2) in an amount of 1 to 20 parts by mass;

(f-1) alkoxysilane compound represented by the following general formula (1):

$$R^2_a R^3_b Si(OR^4)_{4-a-b} \quad (1)$$

wherein $R^2$ is, independently of each other, an alkyl group having 6 to 15 carbon atoms, $R^3$ is, independently of each other, an unsubstituted or substituted monovalent hydrocarbon group having 1 to 10 carbon atoms, $R^4$ is, independently of each other, an alkyl group having 1 to 6 carbon atoms, "a" is an integer of 1 to 3, and b is an integer of 0 to 2, provided that a total of a and b is an integer of 1 to 3, (f-2) a dimethylpolysiloxane represented by the following general formula (2):

$$H_3C-\!\!\left(\!SiO\!\right)_{\!\!c}\!\!-\!\!Si(OR^5)_3 \quad (2)$$

(with $CH_3$ groups on Si)

wherein $R^5$ is, independently of each other, an alkyl group having 1 to 6 carbon atoms and c is an integer of 5 to 100.

EFFECTS OF THE INVENTION

The thermally conductive composite tape of the present invention has good strength, ease of handling and electrical insulation and may be easily transferred to a heat-generating element or a heat-release member. In addition, the thermally conductive adhesive layer attains preferable thermal conduction between the heat-generating element and the heat-release member, and has good adhesion strength so as to fix the element and the member. The thermally conductive composite tape of the present invention is very effective as a thermally conductive member which is placed between the heat-generating element and the heat-release member, fixes them, and transfers heat generated from them.

DETAILED DESCRIPTION OF THE INVENTION (A) Reinforcing Layer

The reinforcing layer in the present invention is preferably a glass cloth, or a synthetic resin film which has an excellent heat resistance and an electrical insulation property and further has flexibility and high mechanical strength. The reinforcing layer may be selected from known substrates.

The glass cloth preferably has a thickness of 10 μm or more and 50 μm or less and has weight of 45 g/m² or less, more preferably a thickness of 20 μm or more and 40 μm or less and weight of 30 g/m² or less. The glass cloth has a relatively low thermal conductivity, so that a small thinness is preferred for better thermal conductivity. However, if the glass cloth hay an excessively thin thickness, the strength is too small and easily broken or difficult to shape. Therefore, the glass cloth preferably has the thickness in the aforesaid range. The glass cloth may be filled in advance with a silicone composition which is used also as the thermally conductive adhesive described later in detail. Alternatively, the glass cloth without the advance filling may be attached as such to the thermally conductive adhesive layer. In the latter case, the thermally conductive adhesive layer is preferably attached to the glass cloth under heating and pressure to make the openings of the glass cloth easily filled with the thermally conductive adhesive composition.

The synthetic resin film usually has a thickness of 2 to 30 μm, preferably 5 to 20 μm. If the synthetic resin film is too thick, the composite sheet of the present invention may have a problem in thermal conductivity. If the synthetic resin film is too thin, its strength is too small for a reinforcing layer and, further, withstand voltage may be low, so that electrical insulation may be insufficient. The synthetic resin film preferably does not have any pore which deteriorates withstand voltage.

Examples of the synthetic resin include aromatic polyimides; polyamides; polyamide-imides:

polyesters such as polyethylene naphthalate; and fluorinated polymers such as polytetrafluoroethylene (PTFE) and tetrafluoroethylene-perfluoroalkyl vinyl ether copolymers. When the aforesaid fluorinated polymer is used as the synthetic resin, the surface of the synthetic resin film is preferably chemically etched with a metallic Na/naphthalene-based treatment liquid in order to improve an adhesion property.

The synthetic resin film is preferably a heat-resistant film having a melting temperature of 200° C. or higher, more preferably 250° C. or higher so as not to cause thermal deformation which leads to reduced mechanical strength. Examples of the heat-resistant synthetic resin film having a melting temperature of 250° C. or higher include aromatic polyimide-based films such as Kapton (trademark) MT (trade name; ex DU PONT-TORAY CO., LTD.).

(B) Thermally Conductive Adhesive Layer

The thermally conductive silicone composite of the present invention has a first thermally conductive adhesive layer and a second thermally conductive adhesive layer on a front surface and a back surface of the aforesaid reinforcing layer (A), respectively. The first and the second thermally conductive adhesive layers may have the same or different compositions. The thermally conductive adhesive layers are obtained by applying and drying the silicone composition comprising the following components (a) to (e) to form a thin layer:

100 parts by mass of (a) organopolysiloxane, 1,000 to 3,000 parts by mass of (b) thermally conductive filler, 100 to 500 parts by mass of (c) silicone resin, 1 to 10 parts by mass of (d) organohydrogenpolysiloxane, and 0.5 to 5 parts by mass of (e) organic peroxide.

Each component will be explained below in detail.

(a) Organopolysiloxane

Component (a) is a linear or branched organopolysiloxane and is preferably represented by the following average composition formula (3):

$$R^1_n SiO_{(4-n)/2} \quad (3)$$

wherein $R^1$ is, independently of each other, an unsubstituted or substituted monovalent hydrocarbon group and n is a positive number of from 1.98 to 2.02.

In the aforesaid formula, $R^1$ is, independently of each other, an unsubstituted or substituted monovalent hydrocarbon group, preferably having 1 to 10 carbon atoms, more preferably 1 to 8 carbon atoms. Examples of the monovalent hydrocarbon group include alkyl groups such as methyl, ethyl, propyl, and butyl groups; cycloalkyl groups such as a cyclohexyl group; alkenyl groups such as vinyl, allyl, butenyl, and hexenyl groups; aryl groups such as phenyl and tolyl groups; and those hydrocarbon groups wherein a part or all of the hydrogen atoms bonded to a carbon atom of these groups is substituted with a halogen atom or a cyano group, such as a chloromethyl group, trifluoropropyl group, and cyanoethyl group. More preferred are methyl, vinyl, phenyl, and trifluoropropyl groups, and it is preferred that 50 mol % or more, particularly 80 mol % or more of $R^1$ is a methyl group.

The organopolysiloxane preferably has 2 or more, more preferably 2 to 20, further preferably 2 to 10, alkenyl groups, such as vinyl, allyl, butenyl, and hexenyl groups in a molecule.

The organopolysiloxane (a) is preferably linear, but may have some branches as long as the rubber strength of the thermally conductive adhesive layer is not detracted. Two or more organopolysiloxanes having different molecular structure or degree of polymerization may be combined. Further, the organopolysiloxane preferably has an average degree of polymerization of 100 to 20,000, more preferably 3,000 to 10,000. The average degree of polymerization may be a number-average degree of polymerization, as determined by gel permeation hromatography (GPC), and reduced to polystyrene.

(b) Thermally conductive filler

The thermally conductive filler (b) may be any known filler conventionally incorporated in thermally conductive compositions and is preferably at least one selected from the group consisting of metals, metal oxides, and metal nitrides. The metals may be nonmagnetic copper or aluminum. The metal oxides may be alumina, silica, magnesia, red oxide, beryllia, titania, or zirconia. The metal nitrides may be aluminum nitride, silicon nitride, or boron nitride. The thermally conductive filler may also be artificial diamonds, or silicon carbides. The thermally conductive filler may have an average particle diameter of 0.1 to 50 μm, preferably 0.5 to 40 μm, more preferably 1 to 30 μm. The thermally conductive filler may be used alone or in combination of two or more. Two or more species of the particles having different average particle diameters may be used in combination. The average particle diameter in the present invention is a volume average particle diameter, as determined by a Microtrac particle diameter distribution analyzer, MT3300EX (Nikkiso Co., Ltd.).

The amount of the thermally conductive filler is 1,000 to 3,000 parts by mass, preferably 1,500 to 2,500 parts by mass, relative to 100 parts by mass of component (a). If the amount of the thermally conductive filler is too large, the tackiness of the obtained tape may be lacked and workability may be poor. If the amount is too small, desired thermal conductivity is not obtained.

(c) Silicone resin

The silicone resin (c) is incorporated in order to provide adhesiveness to a cured product of the silicone composition, that is, cured product of the thermally conductive adhesive layer.

Component (c) is a copolymer composed of $R_3SiO_{1/2}$ units (M-units) and $SiO_{4/2}$ units (Q-units) and characterized in that a molar ratio of M-units to Q-units, M/Q, is 0.5 to 3.0, preferably 0.7 to 1.4, more preferably 0.9 to 1.2. If the ratio M/Q is less than 0.5 or larger than 3.0, the composition does not have a desired adhesion strength.

In the M-unit, R is, independently of each other, an unsubstituted or substituted monovalent hydrocarbon group having no aliphatic unsaturated bond and may be an unsubstituted or substituted monovalent hydrocarbon group having 1 to 10 carbon atoms, preferably 1 to 6 carbon atoms. Examples of the monovalent hydrocarbon group include alkyl groups such as methyl, ethyl, propyl, isopropyl, butyl, isobutyl, tert-butyl, pentyl, neopentyl, hexyl, heptyl, octyl, nonyl, decyl, and dodecyl groups; cycloalkyl groups such as cyclopentyl, cyclohexyl, and cycloheptyl groups; aryl groups such as phenyl, tolyl, xylyl, naphthyl, and biphenylyl groups; and aralkyl groups such as benzyl, phenylethyl, phenylpropyl, and methylbenzyl groups; and those groups in which a part or all of the hydrogen atoms are substituted with a halogen atom such as fluorine, chlorine, or bromine, or a cyano group, such as chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl groups. Among these, unsubstituted or substituted alkyl groups having 1 to 3 carbon atoms and unsubstituted or substituted phenyl groups such as phenyl, chlorophenyl, and fluorophenyl groups are preferred. Further, preferred are methyl, ethyl, propyl, chloromethyl, bromoethyl, 3,3,3-trifluoropropyl and cyanoethyl groups. R may be same as or different from the aforesaid $R^1$ and is desirably same as $R^1$. As described for all of the R are most preferably a methyl group in view of costs, availability, chemical stability and environmental burden, unless any special property, such as solvent resistance, is required. A 60% solution of the silicone resin in toluene may have a viscosity at 25° C. of 3 to 20 mPa·s, preferably 6 to 12 mPa·s. The viscosity may be determined with a rotational viscometer.

The amount of component (c) is 100 to 500 part by mass, preferably 150 to 400 parts by mass, more preferably 200 to 350 parts by mass, relative to 100 parts by mass of component (a). If the amount of component (c) is less than the aforesaid lower limit, the thermally conductive composite tape does not have desired adhesion strength. If the amount is larger than the aforesaid upper limit, the tackiness of the tape may be very strong, so that the workability for peeling the tape from a substrate may be poor. Component (c) itself is solid or viscous liquid at room temperature and may be used in a form of solution. In the case of solution, the amount of component (c) to be incorporated in the composition may be adjusted so that the resin content excluding the solvent satisfies the aforesaid range.

(d) Organohydrogenpolysiloxane

Component (d) is an organohydrogenpolysiloxane having at least two hydrogen atoms each bonded to a silicon atom, i.e. SiH group or hydrosilyl group, in one molecule, and functions to provide good wettability with an interface of an adherend so as to enhance the adhesion strength. The organohydrogenpolysiloxane may be any conventional compound, but preferably has substantially no hydroxyl group bonded to a silicon atom, i.e. silanol group, in a molecule. The organohydrogenpolysiloxane may be used alone or in combination of two or more.

The organohydrogenpolysiloxane is represented by the following average composition formula (4):

$$R^8_a H_b SiO_{(4-a-b)/2} \qquad (4)$$

In the aforesaid formula (4), $R^8$ is, independently of each other, an unsubstituted or substituted monovalent hydrocarbon group preferably having 1 to 10 carbon atoms, more preferably 1 to 8 carbon atoms, and has no aliphatic unsaturated bond such as alkenyl group. Examples of the unsubstituted or substituted monovalent hydrocarbon group include alkyl groups such as methyl, ethyl, propyl, isopropyl, butyl, isobutyl, tert-butyl, pentyl, neopentyl, hexyl, cyclohexyl, octyl, nonyl, and decyl groups: aryl groups such as phenyl, tolyl, xylyl, and naphthyl groups; and aralkyl groups such as benzyl, phenylethyl, and phenylpropyl groups. Among them, alkyl and aryl groups are preferred, and a methyl group is more preferred. Here, "a" is a positive number of 0.7 to 2.1, b is a positive number of 0.001 to 1.0, and a total of a and b is 0.8 to 3.0. Preferably, "a" is a positive number of 1.0 to 2.0, b is a positive number of 0.01 to 1.0, and a total of a and b is 1.5 to 2.5.

The organohydrogenpolysiloxane has at least two (generally, 2 to 200), preferably 3 or more (for example, 3 to 100), more preferably 4 to 50, SiH groups in one molecule. The SiH group may be positioned at the terminal(s) of the molecular chain, in a side chain(s) of the molecular chain, or both. The organohydrogenpolysiloxane may have any of linear, cyclic, branched, or three-dimensional net structure. The number of silicon atoms in one molecule (or degree of polymerization) is usually 2 to 300, preferably 3 to 150, more preferably 4 to 100. The degree of polymerization is a number average degree of polymerization (number average molecular weight), as determined by GPC (gel permeation chromatography) using toluene as a developing solvent and reduced to polystyrene.

Examples of the organohydrogenpolysiloxane include 1,1,3,3-tetramethyldisiloxane; 1,3,5,7-tetramethylcyclotetrasiloxane; tris(hydrogendimethylsiloxy)methylsilane; tris(hydrogendimethylsiloxy)phenylsilane; methylhydrogencyclopolysiloxane; cyclic copolymers of methylhydrogensiloxane and dimethylsiloxane; methylhydrogenpolysiloxane capped, at both terminals, with trimethylsiloxy groups; copolymers of dimethylsiloxane and methylhydrogensiloxane capped, at both terminals, with trimethylsiloxy groups; copolymers of dimethylsiloxane, methylhydrogensiloxane and methylphenylsiloxane capped, at both terminals, with trimethylsiloxy groups; copolymers of dimethylsiloxane, methylhydrogensiloxane and diphenylsiloxane capped, at both terminals, with trimethylsiloxy groups; methylhydrogenpolysiloxane capped, at both terminals, with dimethylhydrogensiloxy groups; dimethylpolysiloxane capped, at both terminals, with dimethylhydrogensiloxy groups; copolymers of dimethylsiloxane and methylhydrogensiloxane capped, at both terminals, with dimethylhydrogensiloxy groups; copolymers of dimethylsiloxane and methylphenylsiloxane capped, at both terminals, with dimethylhydrogensiloxy groups; copolymers of dimethylsiloxane and diphenylsiloxane capped, at both terminals, with dimethylhydrogensiloxy groups; methylphenylpolysiloxane capped, at both terminals, with dimethylhydrogensiloxy groups; and diphenyipolysiloxane capped, at both terminals, with dimethylhydrogensiloxy groups; the aforesaid compounds in which a part or all of the methyl groups are substituted with another alkyl group such as ethyl or propyl; organosiloxane copolymers having a siloxane unit represented by the formula: $R^2_3SiO_{1/2}$ (wherein $R^2$ is a monovalent hydrocarbon group other than an alkenyl group and has the same meaning as the aforesaid $R^1$), a siloxane unit represented by the formula: $R^2_2HSiO_{1/2}$ and a siloxane unit represented by the formula: $SiO_{1/2}$; organosiloxane copolymers having a siloxane unit represented by the formula: $R^2_2HSiO_{1/2}$ and a siloxane unit represented by the formula: $SiO_{4/2}$; and organosiloxane copolymers having a siloxane unit represented by the formula: $R^2HSiO_{2/2}$ and a siloxane unit represented by the formula: $R^2SiO_{3/2}$ or the formula: $HSiO_{3/2}$. These organohydrogenpolysiloxanes may be used in combination of two or more.

The amount of component (d) is 1 to 10 parts by mass, preferably 2 to 9 parts by mass, relative to 100 parts by mass of component (a). If the amount of component (d) is less than the aforesaid lower limit, the adhesiveness to an adherend may be too low. If the amount is larger than the aforesaid upper limit, the adhesive layer may be fragile, so that the adhesion strength may be lower.

(e) Organic peroxide

Component (e) is an organic peroxide which decomposes at desired conditions to generate free radicals. Component (e) functions to promote curing of the thermally conductive adhesive layer at high temperature so as to enhance the adhesion strength of the layer. The organic peroxide is not particularly limited and may be any known one. The organic peroxide may be used either alone or in combination of two or more. Examples of the organic peroxide include peroxyketals such as 1,1-di(t-butylperoxy)cyclohexane and 2,2-di(4,4-di-(t-butylperoxy)cyclohexyl)propane; hydroperoxides such as p-menthane hydroperoxide and diisopropylbenzene hydroperoxide; dialkyl peroxides such as dicumyl peroxide and t-butylcumyl peroxide; diacyl peroxides such as dibenzoyl peroxide and disuccinic acid peroxide; peroxy esters such as t-butylperoxy acetate and t-butylperoxy benzoate; and peroxy dicarbonates such as diisopropyl peroxydicarbonate. In particular, peroxyketals, hydroperoxides, dialkyl peroxides, and peroxyesters, which has a relatively high decomposition temperature, are preferred in view of easy handling and shelf stability. These organic peroxides may be diluted with a proper organic solvent, hydrocarbon, liquid paraffin, or inert solid.

The amount of component (e) is 0.5 to 5 parts by mass, preferably 1 to 3 parts by mass, relative to 100 parts by mass of component (a). If the amount is less than the aforesaid lower limit, curing of the thermally conductive adhesive layer may not satisfactorily proceed when the thermally conductive adhesive layer is pressed to a heat-generating element under heating. Consequently, the adhesion strength may be lower. If the amount is larger than the aforesaid upper limit, much residues generate during bonding with heat and the strength of the adhesive layer may deteriorate and the adhesion strength may be lower.

(f) Surface treatment agent

The aforesaid silicone composition preferably comprises (f) surface treatment agent.

Component (f) functions to disperse the thermally conductive filler (b) uniformly in a matrix composed of the organopolysiloxane (a) when preparing the composition. Component (f) is at least one selected from the following alkoxysilane compound (f-1) and the following dimethylpolysiloxane (f-2) having a trialkoxy group at one terminal. Components (f-1) and (f-2) may be used alone or in combination thereof.

(f-1) Alkoxysilane represented by the following general formula (1):

$$R^2_aR^3_bSi(OR^4)_{4-a-b} \qquad (1)$$

wherein $R^2$ is, independently of each other, an alkyl group having 6 to 15 carbon atoms, $R^3$ is, independently of each other, an unsubstituted or substituted monovalent hydrocarbon group having 1 to 10 carbon atoms, $R^4$ is, independently of each other, an alkyl group having 1 to 6 carbon atoms, "a"

is an integer of 1 to 3, and b is an integer of 0 to 2, provided that a total of a and b is an integer of 1 to 3.

(f-2) Dimethylpolysiloxane represented by the following general formula (2):

(2)

wherein $R^5$ is, independently of each other, an alkyl group having 1 to 6 carbon atoms and c is an integer of 5 to 100.

In the general formula (1), examples of the alkyl group as $R^2$ include hexyl, octyl, nonyl, decyl, dodecyl, and tetradecyl groups. When the number of the carbon atoms of the alkyl group as $R^2$ is in a range of 6 to 15, the wettability of component (c) is sufficiently improved, so that its handling property is better and the resulting composition has improved low-temperature properties.

$R^3$ is an unsubstituted or substituted monovalent hydrocarbon group having 1 to 10 carbon atoms, preferably 1 to 8 carbon atoms, further preferably 1 to 6 carbon atoms. Examples of the monovalent hydrocarbon group include alkyl groups such as methyl, ethyl, propyl, isopropyl, butyl, isobutyl, tert-butyl, pentyl, neopentyl, hexyl, heptyl, octyl, nonyl, decyl, and dodecyl groups; cycloalkyl groups such as cyclopentyl, cyclohexyl, and cycloheptyl groups; aryl groups such as phenyl, tolyl, xylyl, naphthyl, and biphenylyl groups; and aralkyl groups such as benzyl, phenylethyl, phenylpropyl, and methylbenzyl groups; and those groups in which a part or all of the hydrogen atoms are substituted with a halogen atom such as fluorine, chlorine, or bromine, or a cyano group, such as chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl groups. Preferred are unsubstituted or substituted alkyl groups having 1 to 3 carbon atoms such as methyl, ethyl, propyl, chloromethyl, bromoethyl, 3,3,3-trifluoropropyl, and cyanoethyl groups; and unsubstituted or substituted phenyl groups such as phenyl, chlorophenyl, and fluorophenyl groups.

$R^4$ and $R^5$ are, independently of each other, an alkyl group having 1 to 6 carbon atoms, preferably an alkyl group having 1 to 4 carbon atoms. Examples of the alkyl group include methyl, ethyl, propyl, and butyl groups. More preferred is a methyl group.

The amount of component (f) is preferably 1 to 20 parts by mass, more preferably 2 to 15 parts by mass, still more preferably 3 to 10 parts by mass, relative to 100 parts by mass of component (a). If the amount of component (f) is less than 1 part by mass, component (b) is not sufficiently distributed into component (a). If the amount is more than 20 parts by mass, the adhesion strength of the composite tape has lower adhesion strength.

The silicone composition may further comprise, in addition to the aforesaid components (a) to (f), other surface treatment agents for the thermally conductive filler, pigments or dyes for coloring, flame retardants, and other function-improving additives, as long as the purposes of the present invention are not detracted.

The silicone composition is prepared by uniformly mixing the aforesaid components (a) to (e), optional component (f), and the other components. The mixing may be conducted in any conventional method. Preferably, components (a), (b), and (c) and optional component (f) are mixed and, then, components (d) and (e) are added to the mixture and mixed. The resulting silicone composition is applied on both sides of the substrate (that is, aforesaid reinforcing layer (A)), shaped into a form of a thin tape and dried to prepare the thermally conductive adhesive layer of the present invention. Drying may be conducted at 60 to 100° C. for 5 to 15 minutes, preferably at 70 to 90° C. for 5 to 10 minutes. If the drying conditions are not in the aforesaid range, the thermal conductivity of the adhesive layer may be worse due to the remaining solvent, or curing of the composition may proceed undesirably, so that transferability is worse when the thermally conductive adhesive layer is adhered to a heat-generating element for implementation. The thermally conductive adhesive layer is an uncured silicone composition, and may be cured by heat from the heat-generating element when implemented between the heat-release member and the heating generating member.

The thermally conductive adhesive layer preferably has a thickness of 50 to 300 μm, more preferably 75 to 200 μm. If the thickness of the adhesive layer is less than 50 μm, handling property of the tape is poor and the adhesion strength is smaller. If the thickness of the adhesive layer is larger than 300 μm, a desired thermal conductivity is not obtained. Before the composition is applied, a solvent such as toluene or xylene may be added to the composition to adjust the viscosity of the composition.

The thermally conductive composite of the present invention may have a substrate surface-treated with a release agent as a separator film (hereinafter referred to as "release-treated film"). In other words, the release-treated surface of the substrate may be layered on a free surface (not bonded to the reinforcing layer (A)) of the thermally conductive adhesive layer. A step of layering the release-treated film on the thermally conductive adhesive layer may be conducted after layering the thermally conductive adhesive layers on both surfaces of the reinforcing layer. Alternatively, the release-treated surface of the release-treated film is layered on a surface of the thermally conductive adhesive layer and, then, the reinforcing layer is layered on the other surface of the thermally conductive adhesive layer. The separator film attached to the adhesive surface facilitates handling such as transport and cutting into a predetermined length. Here, the separator film may have various release forces by alternating the treatment amount or the type of the release agent or the material of the film.

The separator film is prepared preferably by subjecting at least one surface of paper or a PET film to release treatment with a fluorinated dimethylsilicone-based polymer. Examples of the fluorinated dimethylsilicone-based polymer include fluorinated dimethylsilicone oils having a main chain to which a fluorinated substituent, such as a perfluoroalkyl group or a perfluoropolyether group, is bonded, hereinafter referred to as "fluorine-modified silicone". The perfluoropolyether group is represented by following formula (5), (6) or (7):

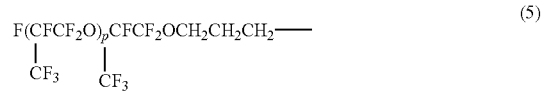

(5)

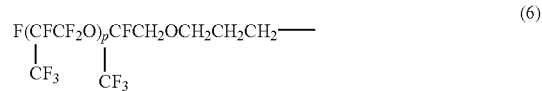

(6)

(7)

wherein p is an integer of 1 to 5 and q is an integer of 3 to 10.

Examples of commercially available fluorine-modified silicone include X-70-201, X-70-258, and X-41-3035, all ex Shin-Etsu Chemical Co., Ltd. The liquid fluorine-modified silicone may be applied on the substrate by, for example, a bar coater, a knife coater, a comma coater, or a spin coater, but not limited to this manner.

Method for Preparing the Thermally Conductive Composite

A method for preparing the thermally conductive composite of the present invention will be described below in further detail. The method for preparing the thermally conductive composite of the present invention comprises steps of layering the first and second thermally conductive adhesive layers, respectively, on surfaces of the reinforcing layer (A), and bonding each conductive adhesive layer to each surface of the reinforcing layer under pressure at room temperature or under heating and pressure to obtain the thermally conductive composite. A manner of layering is not particularly limited and may be any known manner for preparing a composite tape.

When the bonding is conducted under pressure at room temperature, for example, a thermally conductive adhesive layer formed in advance on the separator film may be transferred to both surfaces of the reinforcing layer (A). When the bonding is conducted under heating and pressure, a press jig is heated to 80 to 120° C. and, then, pressure bonding and transfer are conducted similarly. The pressure bonding may be press pressure bonding or roll pressure bonding. The composition of the thermally conductive adhesive layer may be diluted with a solvent and applied on both surfaces of the reinforcing layer (A), followed by drying.

When the reinforcing layer is a glass cloth, the glass cloth may be filled with the silicone composition in advance. To this end, the silicone composition may be applied continuously on the glass cloth by a coating apparatus such as a comma coater, a knife coater, or a kiss coater, equipped with a drying furnace, a heating furnace, and a rolling-up apparatus. The solvent is evaporated and, then, the silicone composition is heated and cured at about 100 to 180° C., preferably about 120 to 150° C., for about 2 to 10 minutes, to thereby obtain the glass cloth filled with the silicone composition.

Alternatively, the thermally conductive adhesive layer formed on a separator film is transferred to an unfilled glass cloth with a press jig heated at 80 to 120° C., so that filling with the composition occurs simultaneously with bonding of the thermally conductive adhesive layer. The pressure bonding may be press contact bonding or roll contact bonding. If the transfer temperature is lower than 80° C., the thermally conductive adhesive layer does not adhere closely to the glass cloth and fails to fill the openings of the cloth, so that the electrical insulation property and the thermal conductivity may be worse. If the temperature is higher than 120° C., the thermally conductive adhesive layer is likely to cure too fast, resulting in a less adhesive force when it attached to the heat-generating element for implementation. The overall thickness of the thermally conductive composite is preferably 150 to 500 μm, more preferably 200 to 400 μm.

The thermally conductive composite of the present invention may be applied at a desired place easily and shows an excellent thermal conduction property, though it is in a form of a thin tape or sheet. Where the thermally conductive composite has the aforesaid separator films on both of its surfaces, the separate film on the one surface is peeled off, and the composite is adhered to a heat-generating electronic component or heat-release member. Then, the other remaining separate film is peeled off, and the revealed surface of the thermally conductive adhesive layer is adhered to a cooling member, so that the thermal conductive composite is interposed between the heat-generating electronic component or heat-release member and the cooling member. The double-sided adhesive tape has excellent dielectric breakdown voltage and strength. Because the thermally conductive composite has the thermally conductive adhesive layers on both sides of the composite, the members are strongly bonded to each other on account of heat generated by the heat-generating member or of the heat pressing in the implementation. After attached, wherein the heating at 100 to 170° C. for 5 to 60 minutes. preferably 120 to 150° C. for 10 to 30 minutes, is enough.

EXAMPLES

The present invention will be explained below in further detail with reference to a series of the Examples and the Comparative Examples, though the present invention is no way limited by these Examples.

Reinforcing layer (A) and components (a) to (f) constituting first and second thermally conductive adhesive layers (B) used in the Examples and the Comparative Examples are as follows.

Reinforcing Layer A (X) Glass cloth: gray fabric cloth H28F103, ex UNITIKA LTD., 30 μm, 28 g/m²

(Y) Polyimide: 30EN ex Kapton, 7.5 μm

Thermally Conductive Adhesive Layer (B)

Component (a): Dimethylpolysiloxane raw rubber having an average degree of polymerization of 8000 and a dimethylvinyl group at the both terminals Component (b):

(b-1) Particulate alumina having a volume average particle diameter of 1 μm (b-2) Spherical alumina having a volume average particle diameter of 10 μm (b-3) Particulate boron nitride having a volume average particle diameter of 15 μm (b-4) Spherical alumina having a volume average particle diameter of 30 μm Component (c): A toluene solution of MQ silicone resin, having a nonvolatile content of 60%, a viscosity at 25° C. of 8 mPa·s, an M/Q molar ratio of 0.95, and all of the substituents bonded to the silicon atoms of the M unit being a methyl group Component (d): Cyclic organohydrogenpolysiloxane represented by the following formula:

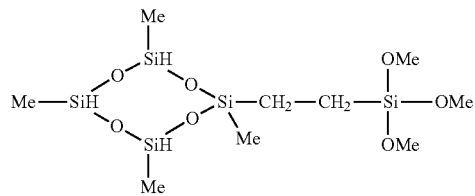

Component (e): 1,1-Di(t-butylperoxy)cyclohexane represented by the following formula:

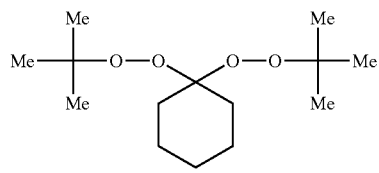 [SMILES: CC(C)(C)OOC1(OOC(C)(C)C)CCCCC1]

Component (f): Component (f-2): Dimethylpolysiloxane having an average degree of polymerization of 30 and a trimethoxysilyl group at one terminal Components (a), (b), (c), and (f) were put in a Shinagawa universal stirrer in the amounts described in the following Tables 1 and 2 and mixed for 60 minutes. Then, components (d) and (e) were added thereto in the amounts described in Tables 1 and 2 and mixed uniformly to obtain a uniform thermally-conductive silicone composition.

Preparation of a Thermally Conductive Adhesive Layer

An adequate amount of toluene was added to the thermally conductive silicone composition thus obtained. The resulting toluene solution was applied onto a PET film surface-treated with a fluorine agent (separator film) and, then, toluene was evaporated at 70° C. to form a thermally conductive adhesive layer having a thickness of 100 μm. The thickness does not include a thickness of the separator film. The release agent used for the surface treatment of the fluorine-treated PET film (separator film) is X-41-3035 (ex Shin-Etsu Chemical Co., Ltd.).

Preparation of Thermally Conductive Composite Tape

A thermally conductive composite was prepared using two pieces of the thus-prepared layered substance of the separator film and the thermally conductive adhesive layer, as described below.

A composite comprising the glass cloth (reinforcing layer X): the thermally conductive adhesive layer formed on the separator film was layered on each side of the glass cloth and bonded pressed at 100° C. to obtain a thermally conductive composite (tape).

A composite comprising the polyimide (reinforcing layer Y): the thermally conductive adhesive layer formed on the separator film was layered on each side of the polyimide and pressed at room temperature to obtain a thermally conductive composite (tape).

The total thickness of the thermally conductive composite (tape) is as described in Tables 1 and 2. The tapes each had a size of 200 mm×300 mm.

In each of the Examples and the Comparative Examples, the first and second thermally conductive adhesive layers have the same composition and the composition is as described in Tables 1 and 2.

Evaluation Method (1) Transferability: The adhesive layer of the thermally conductive composite was adhered to a heat-release member (aluminum heat sink). Then, evaluation was done by judging whether desired adhesion was attained or not.

That is, one of the two separator films was peeled off and the bared adhesive layer side was adhered to the aluminum heat sink. Then, the other separator film was peeled off and it was judged whether the tape was moved (or slided) or not alignment when another separator film was peeled off. If the tape was not moved, the evaluation was "Good", as shown in the Tables. If the tape was moved, the evaluation was "Poor", as shown in the Tables.

(2) Thermal conductivity: The thermally conductive composite from which the both separator films were peeled off was sandwiched by two aluminum plates and pressed at room temperature and 20 psi for 1 hour. A thermal resistance was determined by the laser-flash method. A thermal conductivity was calculated from the relation between the thickness and the thermal resistance.

(3) Shear strength of the adhesive to aluminum: The thermally conductive composite having the thickness as described in the Tables was sandwiched by two aluminum plates of 10×10 mm square and pressed at 120° C. and 20 psi for 1 hour. Then, a peel shear stress at room temperature was determined.

(4) Dielectric breakdown voltage: The dielectric breakdown voltage of the thermally conductive composite from which both separator films were peeled off was determined according to the Japanese Industrial Standards (JIS) K6249.

(5) Tensile strength: The tensile strength of the thermally conductive composite from which both separator films were peeled off was determined by an autograph according to the Japanese Industrial Standards (JIS) K6249.

TABLE 1

|  | | Example | | | | | |
|---|---|---|---|---|---|---|---|
|  | | 1 | 2 | 3 | 4 | 5 | 6 |
|  | | \multicolumn{6}{c}{Reinforcing layer} |
|  | | X: glass cloth | | | Y: polyimide | | |
|  | | \multicolumn{6}{c}{Thermally conductive adhesive layer, part by mass} |
| (a) Linear organopolysiloxane | | 100 | 100 | 100 | 100 | 100 | 100 |
| (b) | b-1: Particulate alumina | 500 | 600 | 1000 | 500 | 600 | 1000 |
|  | b-2: Spherical alumina | 1300 | | 600 | 1300 | | 600 |
|  | b-3: Particulate boron nitride | | 1000 | | | 1000 | |
|  | b-4: Spherical alumina | | | 700 | | | 700 |
| (c) Silicone resin, amount of resin | | 300 | 400 | 400 | 300 | 400 | 400 |
| (d) Cyclic hydrogensiloxane | | 4 | 6 | 4 | 4 | 6 | 8 |
| (e) Organic peroxide | | 2.5 | 2.5 | 2.5 | 2.5 | 1.5 | 1 |
| (f) Surface treatment agent | | 9 | 9 | 15 | 9 | 7.5 | 15 |

TABLE 1-continued

| | Example | | | | | |
|---|---|---|---|---|---|---|
| | 1 | 2 | 3 | 4 | 5 | 6 |
| | | | Reinforcing layer | | | |
| | X: glass cloth | | | Y: polyimide | | |
| | Thermally conductive adhesive layer, part by mass | | | | | |
| Thickness of the composite, μm | 225 | 225 | 225 | 208 | 208 | 208 |
| Transferability | Good | Good | Good | Good | Good | Good |
| Thermal conductivity, W/mK | 1.3 | 1.8 | 2 | 1.1 | 1.5 | 1.7 |
| Shear strength of the adhesive to aluminum, MPa | 13 | 16 | 10 | 14 | 15 | 11 |
| Tensile strength, MPa | 22 | 17 | 25 | 26 | 21 | 20 |
| Dielectric breakdown voltage, kV | 10 | 12 | 10 | 11 | 13 | 11 |

TABLE 2

| | Comparative Example | | | | | | | |
|---|---|---|---|---|---|---|---|---|
| | 1 | 2 | 3 | 4 | 5 | 6 | 7 | 8 |
| | | | | Reinforcing layer (A) | | | | |
| | X: glass cloth | | | Y: polyimide | | | None | Y: polyimide |
| | Thermally conductive adhesive layer, part by mass | | | | | | | |
| (a) Linear organopolysiloxane | 100 | 100 | 100 | 100 | 100 | 100 | 100 | 100 |
| (b) b-1: Particulate alumina | 500 | 600 | 1000 | 500 | 600 | 1000 | 500 | 200 |
| b-2: Spherical alumina | 1300 | | 600 | 1300 | | 600 | 1300 | 300 |
| b-3: Particulate boron nitride | | 1000 | | | 1000 | | | |
| b-4: Spherical alumina | | | 700 | | | 700 | | |
| (c) Silicone resin, amount of resin | 300 | 400 | 50 | 700 | 400 | 400 | 300 | |
| (d) Cyclic hydrogensiloxane | 0.2 | 15 | 4 | 4 | 6 | 8 | 4 | 4 |
| (e) Organic peroxide | 2.5 | 2.5 | 2.5 | 2.5 | 0.2 | 10 | 2.5 | 2.5 |
| (f) Surface treatment agent | 9 | 9 | 15 | 9 | 7.5 | 15 | 9 | 5 |
| Thickness of the composite, μm | 225 | 225 | 225 | 208 | 208 | 208 | 220 | 220 |
| Transferability | Good | Good | Poor | Poor | Good | Good | Good | Good |
| Thermal conductivity, W/mK | 1.4 | 1.8 | 2 | 1.1 | 1.5 | 1.7 | 1.8 | 0.5 |
| Shear strength of the adhesive to aluminum, MPa | 7 | 6 | 10 | ND | 5 | 7 | 6 | 10 |
| Tensile strength, MPa | 22 | 13 | 25 | 26 | 13 | 12 | 8 | 26 |
| Dielectric breakdown voltage, kV | 10 | 12 | 10 | 11 | 12 | 11 | 5 | 10 |

As seen in Table 2, when the amount of the organohydrogenpolysiloxane (d) is too small, wettability of the thermally conductive composite at an interface with an adherend is lower, so that a desired adhesion strength is not obtained (Comparative Example 1). When the amount of the organohydrogenpolysiloxane (d) is too large, the strength of the resulting composite tape is poor and a desired adhesion strength is not obtained (Comparative Example 2). When the amount of the silicone resin (c) is small, the cohesive force of the resulting composite tape is insufficient, so that the transferability is poor (Comparative Example 3). When the amount of the silicone resin (c) is too large, the resulting composite tape has difficulty in peeling-off from the separator film, so that the transferability is poor (Comparative Example 4). When the amount of the organic peroxide (e) is small, curing does not proceed sufficiently during the heat pressing, so that the adhesion strength is poor (Comparative Example 5). When the amount of the organic peroxide (e) is large, a large amount of a decomposition residue occurs and, therefore, the strength of the resulting composite tape is small and a desired adhesion strength is not obtained (Comparative Example 6). When the thermally conductive adhesive layer does not have the reinforcing layer and is in a form of a single layer, the mechanical strength and the electrical insulation property of the resulting tape are worse (Comparative Example 7). When the amount of the thermally conductive filler (b) is too small, the resulting tape has the insufficient thermal conductivity (Comparative Example 8).

In contrast, as seen in Table 1, the composite tapes having the thermally conductive adhesive layer according to the present invention are excellent in transferability and handling ease and also excellent in a thermal conductivity and adhesion strength.

INDUSTRIAL APPLICABILITY

The thermally conductive composite of the present invention is excellent in handling ease, mechanical strength, electrical insulation property, and thermal conductivity and is easily transferred to a substrate, and shows a good adhesion strength to a heat-generating member. The present thermally conductive composite is therefore suitable as a thermally conductive adhesive member, such as thermally conductive composite tape or sheet, to be positioned between a heat-generating element and a heat-release member in semiconductor devices or electronic apparatuses.

The invention claimed is:

1. A thermally conductive composite comprising a first thermally conductive adhesive layer, a reinforcing layer (A) layered on one surface of the first thermally conductive adhesive layer, and a second thermally conductive adhesive layer layered on a free surface of the reinforcing layer (A),
wherein the first and second thermally conductive adhesive layers comprise, independently of each other, a silicone composition consisting of the following components (a) to (e) and optional additives selected from the group consisting of surface treatment agents, pigments, dyes, and flame retardants:
100 parts by mass of (a) linear or branched organopolysiloxane,
1,000 to 3,000 parts by mass of (b) thermally conductive filler,
100 to 500 parts by mass of (c) silicone resin,
1 to 10 parts by mass of (d) organohydrogenpolysiloxane, and
0.5 to 5 parts by mass of (e) organic peroxide.

2. The thermally conductive composite according to claim 1, wherein (c) silicone resin comprises $R_3SiO_{1/2}$ units and $SiO_{4/2}$ units with a molar ratio of $R_3SiO_{1/2}$ units to $SiO_{4/2}$ units of 0.1 to 3.0, wherein R is an unsubstituted or substituted monovalent hydrocarbon group having no aliphatic unsaturated bond.

3. A thermally conductive composite comprising a first thermally conductive adhesive layer, a reinforcing layer (A) layered on one surface of the first thermally conductive adhesive layer, and a second thermally conductive adhesive layer layered on a free surface of the reinforcing layer (A),
wherein the first and second thermally conductive adhesive layers comprise, independently of each other, a silicone composition consisting of the following components (a) to (f) and optional additives selected from the group consisting of surface treatment agents, pigments, dyes, and flame retardants:
100 parts by mass of (a) linear or branched organopolysiloxane,
1,000 to 3,000 parts by mass of (b) thermally conductive filler,
100 to 500 parts by mass of (c) silicone resin,
1 to 10 parts by mass of (d) organohydrogenpolysiloxane,
0.5 to 5 parts by mass of (e) organic peroxide, and
(f) at least one selected from the following components (f-1) and (f-2) in an amount of 1 to 20 parts by mass;
(f-1) alkoxysilane compound represented by the following general formula (1):

wherein $R^2$ is, independently of each other, an alkyl group having 6 to 15 carbon atoms, $R^3$ is, independently of each other, an unsubstituted or substituted monovalent hydrocarbon group having 1 to 10 carbon atoms, $R^4$ is, independently of each other, an alkyl group having 1 to 6 carbon atoms, "a" is an integer of 1 to 3, and b is an integer of 0 to 2, provided that a total of a and b is an integer of 1 to 3,
(f-2) dimethylpolysiloxane represented by the following general formula (2):

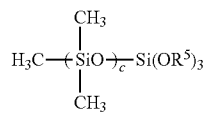

wherein $R^5$ is, independently of each other, an alkyl group having 1 to 6 carbon atoms and c is an integer of 5 to 100.

4. The thermally conductive composite according to claim 1, wherein the reinforcing layer (A) is a synthetic resin layer or a glass cloth.

5. The thermally conductive composite according to claim 4, wherein the synthetic resin is selected from aromatic polyimides, polyamides, polyamide-imides, polyesters and fluorinated polymers.

6. The thermally conductive composite according to claim 1, having a thickness of 150 to 500 μm.

7. The thermally conductive composite according to claim 1, wherein the thermally conductive filler (b) is at least one selected from the group consisting of metals, metal oxides and metal nitrides.

8. The thermally conductive composite according to claim 1, wherein the thermally conductive composite further comprises a substrate surface-treated with a release agent with the treated surface of the substrate being in contact with the free surface of at least one of the first and second thermally conductive adhesive layers.

9. The thermally conductive composite according to claim 8, wherein the release agent is a fluorine-modified silicone having a fluorine substituent bonding to a main chain of the silicone.

10. A method for preparing the thermally conductive composite according to claim 1, the method comprises steps of layering the first and second thermally conductive adhesive layers, respectively, on surfaces of the reinforcing layer (A), and bonding each conductive adhesive layer to each surface of the reinforcing layer under pressure at room temperature or under heating and pressure to obtain the thermally conductive composite.

11. The thermally conductive composite according to claim 3, wherein (c) silicone resin comprises $R_3SiO_{1/2}$ units and $SiO_{4/2}$ units with a molar ratio of $R_3SiO_{1/2}$ units to $SiO_{4/2}$ units of 0.1 to 3.0, wherein R is an unsubstituted or substituted monovalent hydrocarbon group having no aliphatic unsaturated bond.

12. The thermally conductive composite according to 11, wherein the reinforcing layer (A) is a synthetic resin layer or a glass cloth.

13. The thermally conductive composite according to claim 2, wherein the reinforcing layer (A) is a synthetic resin layer or a glass cloth.

14. The thermally conductive composite according to claim 3, wherein the reinforcing layer (A) is a synthetic resin layer or a glass cloth.

15. The thermally conductive composite according to claim 2, having a thickness of 150 to 500 μm.

16. The thermally conductive composite according to claim 3, having a thickness of 150 to 500 μm.

17. The thermally conductive composite according to claim 4, having a thickness of 150 to 500 μm.

18. The thermally conductive composite according to claim 5, having a thickness of 150 to 500 μm.

19. The thermally conductive composite according to claim 2, wherein the thermally conductive filler (b) is at least one selected from the group consisting of metals, metal oxides and metal nitrides.

20. The thermally conductive composite according to claim 3, wherein the thermally conductive filler (b) is at least one selected from the group consisting of metals, metal oxides and metal nitrides.

* * * * *